United States Patent
Read et al.

(10) Patent No.: US 6,934,619 B2
(45) Date of Patent: Aug. 23, 2005

(54) ENGINE TRANSIENT DETECTION AND CONTROL STRATEGY

(75) Inventors: Michael J. Read, Plainfield, IL (US); Talus Park, Dexter, MI (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 2 days.

(21) Appl. No.: 10/679,753

(22) Filed: Oct. 6, 2003

(65) Prior Publication Data

US 2005/0075779 A1 Apr. 7, 2005

(51) Int. Cl.$^7$ ................................................ G06F 7/00
(52) U.S. Cl. ...................... 701/103; 701/101; 701/102; 701/110; 701/115; 123/436; 123/492; 123/493; 123/568.21
(58) Field of Search ................................ 701/101, 103, 701/102, 110, 115; 123/436, 492, 493, 568.21

(56) References Cited

U.S. PATENT DOCUMENTS

| | | | |
|---|---|---|---|
| 4,089,313 A | 5/1978 | Asano et al. | |
| 4,143,621 A | 3/1979 | Long | |
| 4,245,604 A | 1/1981 | Lahiff | |
| 4,359,993 A | 11/1982 | Carlson | |
| 4,447,880 A | 5/1984 | Kasai et al. | |
| 4,502,043 A | 2/1985 | Moore | |
| 4,599,695 A | 7/1986 | Deutsch | |
| 4,625,281 A | 11/1986 | Deutsch | |
| 4,655,034 A | 4/1987 | Kenison et al. | |
| 4,712,529 A | 12/1987 | Terasaka et al. | |
| 4,809,500 A | 3/1989 | Roberts, Jr. | |
| 4,932,376 A | 6/1990 | Linder et al. | |
| 4,991,389 A | 2/1991 | Schafer | |
| 5,033,330 A | 7/1991 | Okahara | |
| 5,271,229 A | 12/1993 | Clarke et al. | |
| 5,331,936 A | 7/1994 | Messih et al. | |
| 5,374,224 A | 12/1994 | Huffmaster et al. | |
| 5,437,253 A | 8/1995 | Huffmaster et al. | |
| 5,445,127 A | 8/1995 | Cullen et al. | |
| 5,642,722 A | 7/1997 | Schumacher et al. | |
| 5,682,868 A | 11/1997 | Moraal | |
| 5,690,087 A | 11/1997 | Schumacher et al. | |
| 5,746,183 A | 5/1998 | Parke et al. | |
| 5,762,054 A | 6/1998 | Schumacher et al. | |
| 5,769,053 A | 6/1998 | Nonaka | |
| 5,778,850 A | 7/1998 | Buratti et al. | |
| 5,819,714 A | 10/1998 | Bush et al. | |
| 5,992,372 A | 11/1999 | Nakajima | |
| 6,067,957 A | 5/2000 | Motose et al. | |
| 6,308,685 B1 | 10/2001 | Becker | |
| 6,314,359 B1 | 11/2001 | Janic et al. | |
| 6,408,624 B1 | 6/2002 | Books et al. | |
| 6,431,129 B1 | 8/2002 | Hammond et al. | |
| 6,584,391 B2 * | 6/2003 | Lack ........................... 701/51 |

* cited by examiner

*Primary Examiner*—Tony M. Argenbright
*Assistant Examiner*—Johnny H. Hoang
(74) *Attorney, Agent, or Firm*—Dennis Kelly Sullivan; Susan L. Lukasik; Jeffrey P. Calfa

(57) ABSTRACT

Engine speed data (N) and engine fueling data (MFDES) are processed to develop rate-of change data values for both engine fueling (FUELING_DIFFERENCE_FILTERED) and engine speed (ENGINE SPEED_DIFFERENCE_ FILTERED). The latter are processed according to a look-up table (30) to select a data value for an adder (ENGINE SPEED/FUELING_ROC_ADDER). The adder data value is added to the data value of a control parameter, such as engine fueling (MFDES), to compensate for engine transients.

8 Claims, 1 Drawing Sheet

ENGINE TRANSIENT DETECTION AND CONTROL STRATEGY

FIELD OF THE INVENTION

This invention relates generally to internal combustion engines for propelling motor vehicles. More specifically it relates to a strategy in an engine control system for detecting engine transients, using the severity of a detected transient to select a data value for an adder from a look-up table, and then adding the selected data value to the data value of one or more of certain engine control parameters to compensate for the detected transient.

BACKGROUND OF THE INVENTION

Many strategies exist for handling various aspects of engine control during engine transients. Examples are found in U.S. Pat. Nos. 6,067,957; 5,778,850; 5,746,183; and 4,932,376. In general, an engine transient strategy involves detection of a transient sufficient to call for some modification of a control parameter, determining an appropriate modification, and then applying the modification to the control parameter.

One form of modification involves the determination of an appropriate adder and application of the adder to the control parameter. The intent is to minimize, and ideally eliminate, the effect of the transient on an engine function controlled by the control parameter during the transient. The ability of processors in engine control systems to rapidly process data in real time enables transients to be quickly detected and suitable modifiers developed and applied.

When an engine is running essentially in a steady-state condition, meaning that engine speed and engine load are both essentially constant, an engine control strategy may provide a particular set-point of operation for a particular control parameter for maintaining operation at that particular set-point. A change in any of several different inputs to the engine may initiate a transient that when concluded, results in engine operation at a new and different set-point. During a transient, the processing of data will continually update the set-point for a sub-system whose inputs are changing because of the transient. The dynamics of the event may be such that a significant disparity is created between the data value calculated for the set-point for a particular control parameter and a data value that would provide a more appropriate value given the nature of the event. Consequently, modification would be appropriate in that instance.

Engine transients have implications on various aspects of engine performance. For example, they may have the potential to cause poor engine response, momentary spikes in certain constituents of tailpipe emissions, momentary engine misfire, and/or undesirable noises. Adjustment of the data values for certain engine control parameters therefore becomes appropriate during engine transients.

One example of an input that can initiate an engine transient is accelerator pedal position. When a driver depresses the accelerator pedal in a vehicle, the engine control system will typically respond by calling for increased fueling. When the driver releases the accelerator pedal, the engine control system will typically respond by calling for decreased fueling. This particular example is driver-initiated, with the input to the engine control system being an on-board signal from a sensor, i.e. an accelerator position sensor.

Another example of an input to the engine that can initiate a transient is a change in engine load. A change in engine load can originate on-board the vehicle, for example when the load imposed on the engine by an engine-driven accessory changes.

The source of a change in engine load can also originate external to the vehicle. For example, if a vehicle that is running on a horizontal road surface at a constant speed with its engine operating in essentially a steady-state condition encounters a headwind or a hill, engine load will increase. If the driver does not operate the accelerator pedal in an attempt to maintain speed, the increased load will initiate a transient because the engine will begin to decelerate. Although the transient that is induced by a change in engine load in this latter example does not originate through driver action or through a change in an on-board sensor, the event will be indicated to the engine control system by change in the value of engine speed data being processed by the control system. As the load increases and the engine and vehicle both begin to slow, the driver may intentionally further depress the accelerator pedal in an attempt to maintain vehicle speed, and in that instance, the change in accelerator pedal position will also be noticed by the engine control system. Engine speed data is derived in any conventional manner and typically published on a data bus serving a processor in the control system.

A typical engine control system may be considered to comprise various control sub-strategies. Heretofore, a control strategy may have handled an engine transient in different ways for different sub-strategies. In other words, a particular transient control strategy might be unique to a particular subsystem. Certain trade-offs or compromises may have had to be made between the various sub-systems in order to meet global engine requirements for a handling a full range of transients and a full range of steady-state operating set-points.

Engine fueling is an example of one such sub-strategy. Within that particular sub-strategy, both the amount of engine fueling and the timing of engine fueling may be controlled.

SUMMARY OF THE INVENTION

The present invention relates to an improvement in engine control system strategy for handling engine transients without compromising desired steady-state set-points of operation. The inventive strategy develops an adder value, based on detected engine speed and fueling transients, that may be applied to one or more of various engine control parameters during an engine transient. It is believed that the potential for global use of the adder in multiple sub-system strategies, or optionally in only selected ones of the sub-systems, can improve various individual aspects of engine performance, and collectively, improve overall engine performance. The inventive strategy can be implemented entirely in an electronic engine control module.

Accordingly, one generic aspect of the present invention relates to a method for modifying an engine control parameter for engine transients. Data values that are correlated with rate of change of engine fueling and rate of change of engine speed and that are indicative of engine transients are processed according to a look-up table that contains multiple data values of an adder. Each data value in the table correlates with a corresponding pair of rate-of-change of engine fueling and rate-of-change of engine speed data values. The processing selects from the table an adder data value correlated with the processed rate of change of engine fueling and the processed rate of change of engine speed data values. The data value for the control parameter is modified by adding the selected adder data value from the table to the data value for the control parameter.

Another generic aspect relates to the method as just described wherein the adder data value selected from the table is applied to the data values for multiple control parameters.

Still another generic aspect relates to an internal combustion engine comprising multiple sub-systems under the control of an engine control system that comprises a processor. The processor processes various data to develop a data value for a control parameter for one of the multiple sub-systems. The processor also processes data values that are correlated with rate of change of engine fueling and rate of change of engine speed and that are indicative of engine transients according to a look-up table that contains multiple data values of an adder. Each adder data value in the table correlates with a corresponding pair of rate-of-change of engine fueling and rate-of-change of engine speed data values. The processor selects from the table an adder data value correlated with the processed rate of change of engine fueling and the processed rate of change of engine speed data values, and then adds the selected adder data value to the data value for the control parameter for one of the multiple sub-systems.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
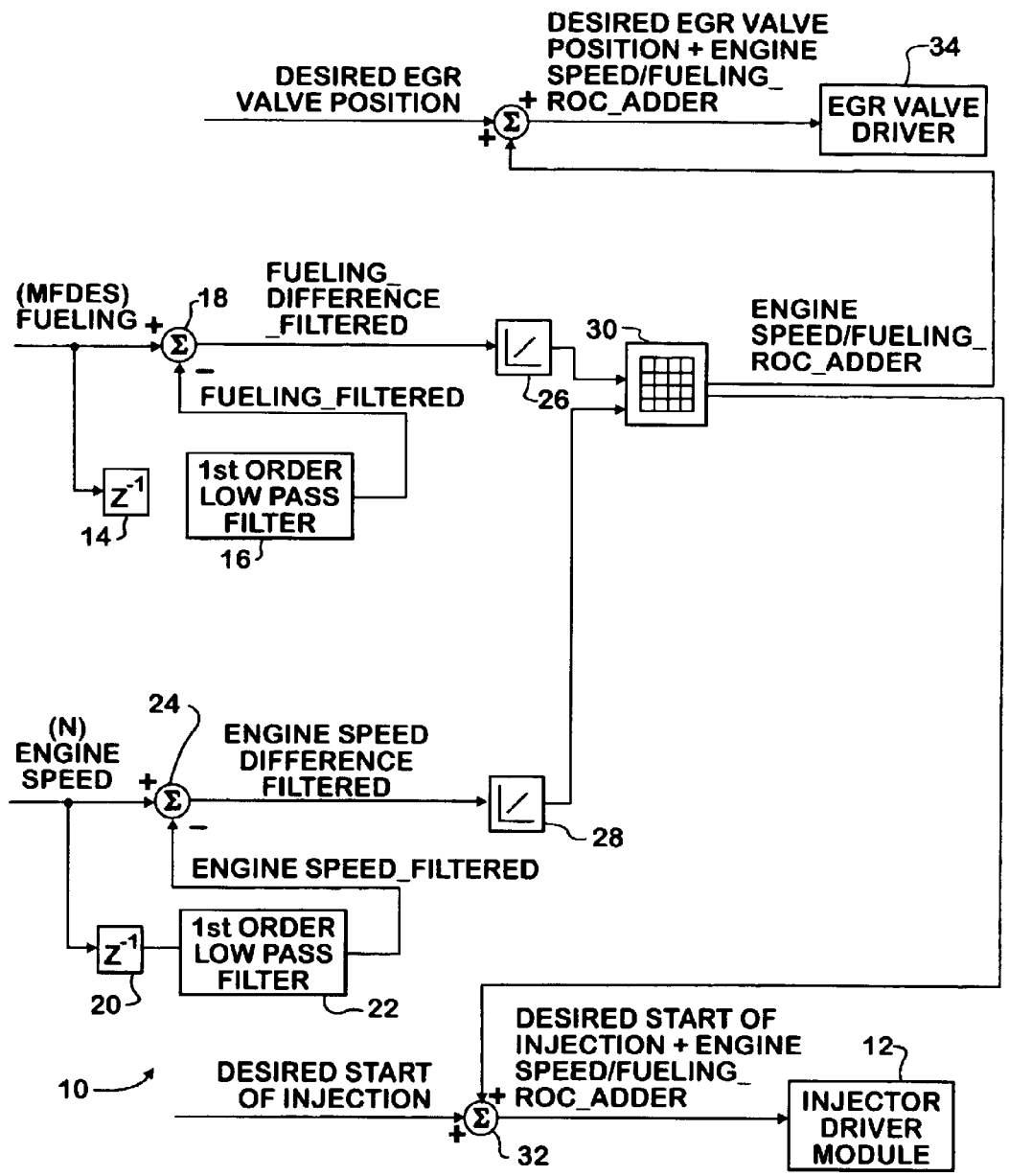
FIG. 1 is a general schematic diagram of a portion of an exemplary internal combustion engine control system strategy relevant to the disclosure of the present invention.

FIG. 1 shows a portion of an exemplary control system strategy 10 for a processor in an internal combustion engine, this particular engine being a diesel engine. The processor processes various data, including engine speed data N and engine fueling data MFDES, according to a processing strategy that is embedded in the processor. When the engine is running in a steady state where engine speed and load are essentially constant, the data value for MFDES and the data value for fueling are essentially constant. The data value for MFDES may be considered a steady-state set-point for engine fueling.

The engine is capable of steady-state operation at each of a multitude of set-points, each of which may be characterized by a unique combination of data values for MFDES and N. The data value for MFDES is used to set the amount of fuel that is injected by fuel injectors into engine cylinders.

The fuel injectors are operated by an injector driver module 12 under the control of the processor. As shown in the drawing, timing of fuel injection (Desired Start of Injection) may be another input to module 12. There may be still further inputs (also not specifically illustrated) to compensate for factors, such as engine temperature, if those inputs are not taken into account in the strategy that develops MFDES.

The data value for MFDES, whether compensated for such other factors or not, is not however compensated for engine transients. It is toward providing compensation for engine transients that the present invention is directed.

The inventive strategy comprises processing engine speed data N and engine fueling data MFDES to develop rate-of-change of engine speed data, representing engine acceleration when positive and engine deceleration when negative, and rate-of-change of engine fueling data. Values for the two rate-of-change data items are obtained by processing. The processing of engine fueling MFDES will be explained in detail, and with that explanation, the reader will understand that the processing of engine speed N is performed in a corresponding manner.

At each iteration of the strategy, digital processing performed by the processor reads a new, or updated, value for MFDES. The immediately previous value for MFDES is retained (reference numeral 14), and a filter function 16 is applied according to the algorithm shown in FIG. 1. The result is algebraically summed, with polarities as indicated, by a summing function 18 to develop a difference value FUELING_DIFFERENCE_FILTERED. Because the strategy iterates at a known rate, the data value for FUELING_DIFFERENCE_FILTERED corresponds to the rate at which engine fueling is changing.

Similarly, an immediately previous value for engine speed N is retained (reference numeral 20), a filter algorithm 22 shown in the drawing is applied, and the result of the filter algorithm is algebraically summed by a summing function 24 with the updated value for N, as indicated, to develop a difference value ENGINE SPEED_DIFFERENCE_FILTERED, corresponding to the rate at which engine speed is changing.

The data value for engine fueling MFDES is a result of processing data that typically includes accelerator pedal position or desired engine torque. In that regard acceleration pedal position, desired engine torque, and (desired) engine fueling may be considered essentially equivalent. The result of the processing is intended to yield a data value for MFDES that corresponds to a particular set-point that may be compensated for certain factors, but that is not compensated for engine transients caused by engine speed and fueling changes.

The respective data values for MFDES and N exist in the processor in a number base (binary base for example) that is suited for digital processing. While the processed values themselves correspond to the values of the respective parameters, they are not necessarily in units that render the data values for FUELING_DIFFERENCE_FILTERED and ENGINE SPEED_DIFFERENCE_FILTERED suitable for further processing in accordance with principles of the invention. Consequently normalization may be appropriate.

FUELING_DIFFERENCE_FILTERED is normalized by a normalizer function 26, and ENGINE SPEED_DIFFERENCE_FILTERED is normalized by a normalizer function 28. Normalization yields normalized FUELING_DIFFERENCE_FILTERED and normalized ENGINE SPEED_DIFFERENCE_FILTERED, both of which are then processed according to a look-up table 30.

Look-up table 30 contains multiple data values of an adder, each of which correlates with a corresponding pair of rate-of-change of engine fueling and rate-of-change of engine speed data values. The processor selects from look-up table 30 an adder data value correlated with the processed rate of change of engine fueling and the processed rate of change of engine speed data values. The adder data value is represented by the parameter ENGINE SPEED/FUELING_ROC_ADDER.

The selected data value for ENGINE SPEED/FUELING_ROC_ADDER is then used to modify any of one or more engine control parameters. The drawing shows the adder being summed with the data value for Desired Start of Injection, specifically being algebraically added to the data value for Desired Start of Injection by a summing function 32. This means that when the value for ENGINE SPEED/FUELING_ROC_ADDER is positive it is additive to Desired Start of Injection and when the value is negative, it is subtracted from Desired Start of Injection.

The example shows use of the adder to also modify a control parameter, Desired EGR Valve Position, for control of an EGR Valve Driver 34, in a similar manner.

Adder values in look-up table 30 may be developed in any suitable way, by engineering design and/or by actual operation of a vehicle.

While a presently preferred embodiment of the invention has been illustrated and described, it should be appreciated that principles of the invention apply to all embodiments falling within the scope of the following claims.

What is claimed is:

1. A method for modifying an engine control parameter for engine transients comprising:
   a) processing data values that are correlated with rate of change of engine fueling and rate of change of engine speed and that are indicative of engine transients according to a look-up table that contains multiple data values of an adder, each of which correlates with a corresponding pair of rate-of-change of engine fueling and rate-of-change of engine speed data values to select, from the table, an adder data value correlated with the processed rate of change of engine fueling and the processed rate of change of engine speed data values; and
   b) modifying a data value for the control parameter by adding the selected adder data value from the table to the data value for the control parameter.

2. A method as set forth in claim 1 in which step a) comprises processing a data value for rate of change of engine fueling according to a first normalizing function to develop the data value correlated with rate of change of engine fueling, and processing a data value for rate of change of engine speed according to a second normalizing function to develop the data value correlated with rate of change of engine speed.

3. A method for modifying multiple engine control parameters for engine transients comprising:
   a) processing data values that are correlated with rate of change of engine fueling and rate of change of engine speed and that are indicative of engine transients according to a look-up table that contains multiple data values of an adder, each of which correlates with a corresponding pair of rate-of-change of engine fueling and rate-of-change of engine speed data values to select, from the table, an adder data value correlated with the processed rate of change of engine fueling and the processed rate of change of engine speed data values; and
   b) modifying a data value for each of the multiple control parameters by adding the selected adder data value from the table to the data value for each of the multiple control parameters.

4. A method as set forth in claim 3 in which step a) comprises processing a data value for rate of change of engine fueling according to a first normalizing function to develop the data value correlated with rate of change of engine fueling, and processing a data value for rate of change of engine speed according to a second normalizing function to develop the data value correlated with rate of change of engine speed.

5. An internal combustion engine comprising:
   a) multiple sub-systems under the control of an engine control system that comprises a processor;
   b) wherein the processor processes various data to develop a data value for a control parameter for one of the multiple sub-systems;
   c) wherein the processor processes data values that are correlated with rate of change of engine fueling and rate of change of engine speed and that are indicative of engine transients according to a look-up table that contains multiple data values of an adder, each of which correlates with a corresponding pair of rate-of-change of engine fueling and rate-of-change of engine speed data values to select, from the table, an adder data value correlated with the processed rate of change of engine fueling and the processed rate of change of engine speed data values; and
   d) wherein the processor adds the selected adder data value from the table to the data value for the control parameter for one of the multiple sub-systems.

6. An internal combustion engine as set forth in claim 5 wherein the processor processes a data value for rate of change of engine fueling according to a first normalizing function to develop the data value correlated with rate of change of engine fueling, and processes a data value for rate of change of engine speed according to a second normalizing function to develop the data value correlated with rate of change of engine speed.

7. An internal combustion engine as set forth in claim 5 wherein the processor adds the selected adder data value from the table to the data value for the respective control parameter for each of multiple ones of the sub-systems.

8. An internal combustion engine as set forth in claim 7 wherein the processor processes a data value for rate of change of engine fueling according to a first normalizing function to develop the data value correlated with rate of change of engine fueling, and processes a data value for rate of change of engine speed according to a second normalizing function to develop the data value correlated with rate of change of engine speed.

* * * * *